United States Patent
Jung et al.

(10) Patent No.: US 10,661,805 B2
(45) Date of Patent: May 26, 2020

(54) VEHICLE CONTROL UNIT (VCU) AND OPERATING METHOD THEREOF

(71) Applicants: SAMSUNG ELECTRONICS CO., LTD., Suwon-si (KR); North Carolina State University, Raleigh, NC (US)

(72) Inventors: Daebong Jung, Seongnam-si (KR); Mo-Yuen Chow, Raleigh, NC (US); Habiballah Rahimi Eichi, Cambridge, MA (US); Jinyong Jeon, Yongin-si (KR)

(73) Assignees: Samsung Electronics Co., Ltd., Suwon-si (KR); North Carolina State University, Raleigh, NC (US)

( * ) Notice: Subject to any disclaimer, the term of this patent is extended or adjusted under 35 U.S.C. 154(b) by 236 days.

(21) Appl. No.: 15/646,887

(22) Filed: Jul. 11, 2017

(65) Prior Publication Data

US 2018/0141555 A1    May 24, 2018

Related U.S. Application Data

(60) Provisional application No. 62/425,209, filed on Nov. 22, 2016.

(30) Foreign Application Priority Data

Nov. 23, 2016    (KR) .......................... 10-2016-0156553

(51) Int. Cl.
*B60L 15/00*    (2006.01)
*B60W 30/188*    (2012.01)
(Continued)

(52) U.S. Cl.
CPC ......... *B60W 30/1886* (2013.01); *B60L 15/20* (2013.01); *B60L 15/2045* (2013.01);
(Continued)

(58) Field of Classification Search
USPC ..................................................... 701/1–119
See application file for complete search history.

(56) References Cited

U.S. PATENT DOCUMENTS

| 4,422,322 A | * | 12/1983 | Spangler | B60G 17/0165 73/105 |
| 5,432,700 A | * | 7/1995 | Hrovat | B60G 17/0165 280/5.515 |

(Continued)

FOREIGN PATENT DOCUMENTS

| DE | 10 2015 108 270 A1 | 12/2015 |
| EP | 2 792 551 A1 | 10/2014 |

(Continued)

OTHER PUBLICATIONS

Holve, R., et al., "Adaptive fuzzy control for driver assistance in car-following," Proceedings of the $3^{rd}$ European Congress on Intelligent Techniques and Soft Computing—EUFIT, held in Aachen, DE, Aug. 1995 (pp. 149-1153).

(Continued)

*Primary Examiner* — Jonathan L Sample
(74) *Attorney, Agent, or Firm* — NSIP Law

(57) ABSTRACT

Disclosed are a vehicle control unit (VCU) and an operation method thereof that calculate a speed variation of a vehicle based on input information, predict an average speed of the vehicle based on the calculated speed variation, generate a first speed profile based on the predicted average speed, and generate a second speed profile by applying speed noise information to the first speed profile.

24 Claims, 10 Drawing Sheets

(51) Int. Cl.
  *B60L 15/20* (2006.01)
  *B60L 50/50* (2019.01)
  *B60L 58/14* (2019.01)
  *B60W 50/14* (2020.01)

(52) U.S. Cl.
  CPC .............. *B60L 50/50* (2019.02); *B60L 58/14* (2019.02); *B60W 50/14* (2013.01); *B60L 2240/12* (2013.01); *B60L 2240/14* (2013.01); *B60L 2240/645* (2013.01); *B60L 2240/662* (2013.01); *B60L 2240/667* (2013.01); *B60L 2240/68* (2013.01); *B60L 2250/16* (2013.01); *B60L 2260/32* (2013.01); *B60L 2260/44* (2013.01); *B60L 2260/48* (2013.01); *B60L 2260/52* (2013.01); *B60L 2260/54* (2013.01); *B60W 2510/09* (2013.01); *B60W 2510/305* (2013.01); *B60W 2520/10* (2013.01); *B60W 2550/12* (2013.01); *B60W 2550/141* (2013.01); *B60W 2550/20* (2013.01); *B60W 2560/02* (2013.01); *B60W 2720/103* (2013.01); *Y02T 10/645* (2013.01); *Y02T 10/705* (2013.01); *Y02T 10/7005* (2013.01); *Y02T 10/72* (2013.01); *Y02T 10/7283* (2013.01); *Y02T 10/7291* (2013.01); *Y02T 90/16* (2013.01)

(56) References Cited

U.S. PATENT DOCUMENTS

| | | | |
|---|---|---|---|
| 5,600,553 A | 2/1997 | Kawasaki et al. | |
| 6,317,686 B1 | 11/2001 | Ran | |
| 6,661,345 B1* | 12/2003 | Bevan | G08B 21/06 340/575 |
| 8,346,420 B2 | 1/2013 | Tarnowsky et al. | |
| 8,433,455 B2 | 4/2013 | Siy et al. | |
| 8,594,918 B2 | 11/2013 | Meyer-Ebeling et al. | |
| 8,676,400 B2* | 3/2014 | Tippelhofer | B60L 15/2045 701/1 |
| 8,954,255 B1 | 2/2015 | Crawford | B60W 30/143 701/93 |
| 9,183,745 B2* | 11/2015 | Huber | B60W 30/16 |
| 9,346,452 B2* | 5/2016 | Qiu | B60L 3/12 |
| 2004/0039516 A1* | 2/2004 | Willembrock | G08G 1/0104 701/117 |
| 2009/0210117 A1* | 8/2009 | Oowada | B60R 21/0132 701/46 |
| 2010/0209881 A1* | 8/2010 | Lin | G09B 19/167 434/65 |
| 2010/0209882 A1* | 8/2010 | Lin | G09B 19/167 434/65 |
| 2010/0211270 A1* | 8/2010 | Chin | B60W 40/09 701/44 |
| 2011/0106416 A1* | 5/2011 | Scofield | G08G 1/0104 701/119 |
| 2011/0224868 A1 | 9/2011 | Collings, III et al. | |
| 2011/0307165 A1* | 12/2011 | Hiestermann | G01C 21/32 701/119 |
| 2011/0320111 A1* | 12/2011 | Sarma | G08G 1/0104 701/118 |
| 2012/0065871 A1* | 3/2012 | Deshpande | G08G 1/0112 701/118 |
| 2012/0259487 A1* | 10/2012 | Friesen | B61F 5/245 701/20 |
| 2012/3031398 | 11/2012 | Wada | |
| 2013/0006458 A1* | 1/2013 | Bhattarai | B60W 50/082 701/22 |
| 2013/0166123 A1 | 6/2013 | Donald, III et al. | |
| 2013/0268152 A1* | 10/2013 | Koshizen | B60L 15/2045 701/22 |
| 2014/0067240 A1* | 3/2014 | Yu | B60W 40/13 701/112 |
| 2014/0172282 A1 | 6/2014 | Feng et al. | |
| 2014/0214267 A1* | 7/2014 | Sellschopp | B60L 58/12 701/34.2 |
| 2014/0371983 A1* | 12/2014 | Miyashita | B60L 1/003 701/36 |
| 2015/0046132 A1* | 2/2015 | Papajewski | B60W 50/0097 703/2 |
| 2015/0142305 A1 | 5/2015 | Kubo | |
| 2015/0168157 A1* | 6/2015 | Hoch | G01C 21/3469 701/400 |
| 2016/0009304 A1* | 1/2016 | Kumar | B61L 27/0027 701/19 |
| 2016/0129803 A1 | 5/2016 | Grewal et al. | |
| 2016/0159352 A1* | 6/2016 | Kim | B60W 30/143 701/94 |
| 2016/0176309 A1* | 6/2016 | Jeon | B60L 58/12 701/22 |
| 2017/0146362 A1* | 5/2017 | Bai | G01C 21/3469 |
| 2017/0297572 A1* | 10/2017 | Roos | B60W 40/076 |
| 2017/0370319 A1* | 12/2017 | Homant | F02D 41/3064 |

FOREIGN PATENT DOCUMENTS

| | | | | |
|---|---|---|---|---|
| EP | 2792551 A1 * | 10/2014 | | B60L 1/003 |
| JP | 2009-279992 A | 12/2009 | | |
| JP | 2010-52652 A | 3/2010 | | |
| JP | 4843879 B2 | 12/2011 | | |
| JP | 4978747 B2 | 7/2012 | | |
| KR | 10-0273536 B1 | 1/2001 | | |
| KR | 10-0837361 B1 | 6/2008 | | |
| KR | 10-1484249 B1 | 1/2015 | | |
| KR | 10-1509693 B1 | 4/2015 | | |
| WO | WO 2012/062760 A1 | 5/2012 | | |
| WO | WO 2014/206791 A2 | 12/2014 | | |
| WO | WO 2015/136189 A1 | 9/2015 | | |

OTHER PUBLICATIONS

Kanoulas, E., et al., "Finding fastest paths on a road network with speed patterns," Proceedings of the 22nd International Conference on Data Engineering, ICDE'06. . . IEEE, 2006 (10 pages).

Extended European Search Report Issued by the European Patent Office dated Apr. 24, 2018 in Corresponding European Patent Application No. 17202718.7 (10 pages in English).

* cited by examiner

FIG. 4
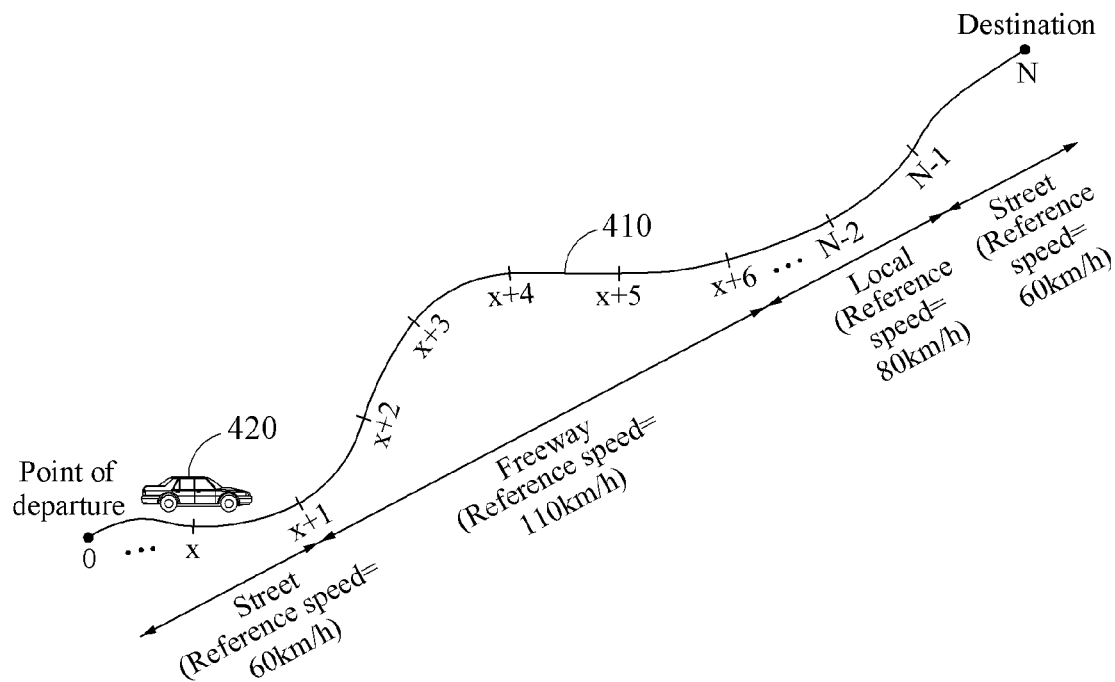
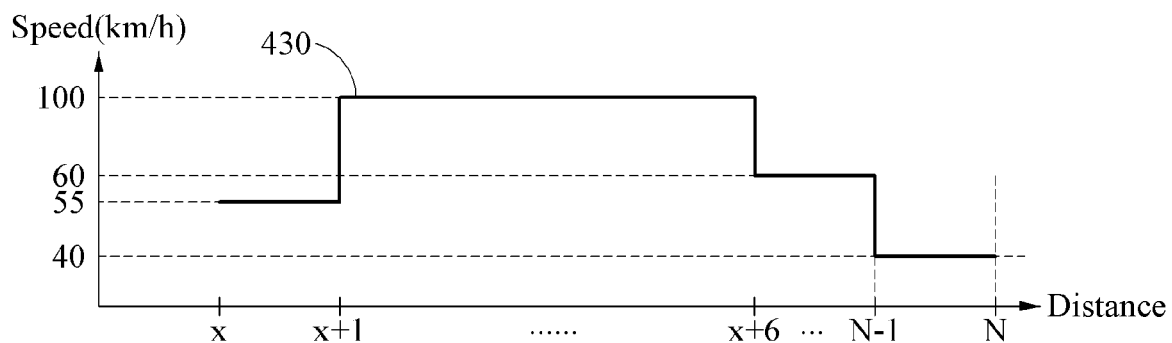
Apply speed noise information
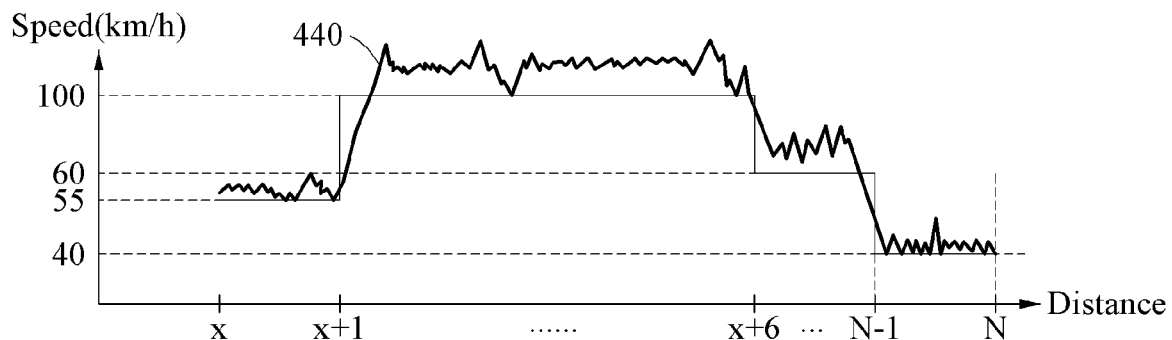

Direct solar radiation
Diffuse solar radiation
Reflected solar radiation

VEHICLE CONTROL UNIT (VCU) AND OPERATING METHOD THEREOF

CROSS-REFERENCE TO RELATED APPLICATIONS

This application claims the benefit under 35 USC 119(a) of Korean Patent Application No. 10-2016-0156553 filed on Nov. 23, 2016, in the Korean Intellectual Property Office, the entire disclosure of which is incorporated herein by reference for all purposes. This application further claims the benefit under 35 USC 119(e) of U.S. Provisional Application No. 62/425,209 filed on Nov. 22, 2016, the entire disclosure of which is incorporated herein by reference for all purposes.

BACKGROUND

1. Field

The following description relates to a vehicle control unit (VCU).

2. Description of Related Art

As environmental problems and energy resources are becoming important issues, electric vehicles are emerging as future transportation.

An electric vehicle generates a speed profile based on a current driving speed. The speed profile generated by such a calculation does not consider ambient environment information of the electric vehicle and traffic information. Thus, the generated speed profile is greatly different from an actual driving speed profile of the electric vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of operating a vehicle control unit (VCU), the method including calculating a speed variation of a vehicle based on input information, predicting an average speed of the vehicle based on the calculated speed variation, generating a first speed profile based on the predicted average speed, and generating a second speed profile by applying speed noise information to the first speed profile.

The calculating may include calculating a speed variation corresponding to each point on a path of the vehicle based on respective input information associated with the each point.

The input information may include any one or any combination of any two or more of weather information, traffic flow information, or road type information.

The predicting may include predicting an average speed of the vehicle at each point on a path of the vehicle based on a speed variation corresponding to the each point and a reference speed of the each point.

The generating of the first speed profile may include generating the first speed profile based on an average speed predicted for each point on a path of the vehicle.

The method may further include predicting an amount of power to be used by the vehicle based on the second speed profile.

The method may further include predicting an amount of power to be transferred to a powertrain of the vehicle based on the second speed profile, and predicting an amount of power to be used by an air conditioning system of the vehicle based on either one or both of solar radiation information or ambient temperature information.

The method may further include determining a driving range of the vehicle based on a predicted amount of power to be used by the vehicle and either one or both of current state information of a battery of the vehicle or a current amount of fuel of the vehicle.

The determining may include predicting either one or both of state information of the battery or an amount of fuel at a destination based on the predicted amount of power to be used by the vehicle, and determining whether the vehicle is able to reach the destination based on either one or both of the predicted state information or the predicted amount of fuel.

The method may further include generating guide information related to driving of the vehicle based on the second speed profile, and outputting the guide information to a user of the vehicle.

The generating of the guide information may include comparing a predicted average speed determined from the second speed profile to a target speed determined from driving history information of the vehicle, and generating the guide information based on a result of the comparing.

The generating of the guide information may include identifying a speed section satisfying a predetermined criterion in the second speed profile, and generating the guide information related to driving on a path corresponding to the identified speed section.

In another general aspect, there is also provided a VCU including a processor configured to calculate a speed variation of a vehicle based on input information, predict an average speed of the vehicle based on the calculated speed variation, generate a first speed profile based on the predicted average speed, and generate a second speed profile by applying speed noise information to the first speed profile.

The VCU may further include a memory configured to store instructions, and the processor may be further configured to execute the instructions to configure the processor to calculate the speed variation of the vehicle based on the input information, predict the average speed of the vehicle based on the calculated speed variation, generate the first speed profile based on the predicted average speed, and generate the second speed profile by applying the speed noise information to the first speed profile.

The processor may be configured to calculate a speed variation corresponding to each point on a path of the vehicle based on input information associated with the each point.

The processor may be configured to predict an average speed of the vehicle at each point on a path of the vehicle based on a speed variation corresponding to the each point and a reference speed of the each point.

The processor may be configured to generate the first speed profile based on an average speed predicted for each point on a path of the vehicle.

The processor may be configured to predict an amount of power to be used by the vehicle based on the second speed profile.

The processor may be configured to predict an amount of power to be transferred to a powertrain of the vehicle based on the second speed profile, and to predict an amount of power to be used by an air conditioning system of the vehicle based on either one or both of solar radiation information or ambient temperature information.

The processor may be configured to determine a driving range of the vehicle based on a predicted amount of power to be used by the vehicle and either one or both of current state information of a battery of the vehicle or a current amount of fuel of the vehicle.

The processor may be configured to predict either one or both of state information of the battery or an amount of fuel at a destination based on the predicted amount of power to be used by the vehicle, and to determine whether the vehicle is able to reach the destination based on either one or both of the predicted state information or the predicted amount of fuel.

The processor may be configured to generate guide information related to driving of the vehicle based on the second speed profile, and to output the guide information to a user of the vehicle.

The processor may be configured to compare a predicted average speed determined from the second speed profile to a target speed determined from driving history information of the vehicle, and to generate the guide information based on a comparison result.

The processor may be configured to identify a speed section satisfying a predetermined criterion in the second speed profile, and to generate the guide information related to driving on a path corresponding to the identified speed section.

Other features and aspects will be apparent from the following detailed description, the drawings, and the claims.

BRIEF DESCRIPTION OF THE DRAWINGS

FIG. 4 illustrates an example of generating a first speed profile and a second speed profile by a VCU, in accordance with an embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
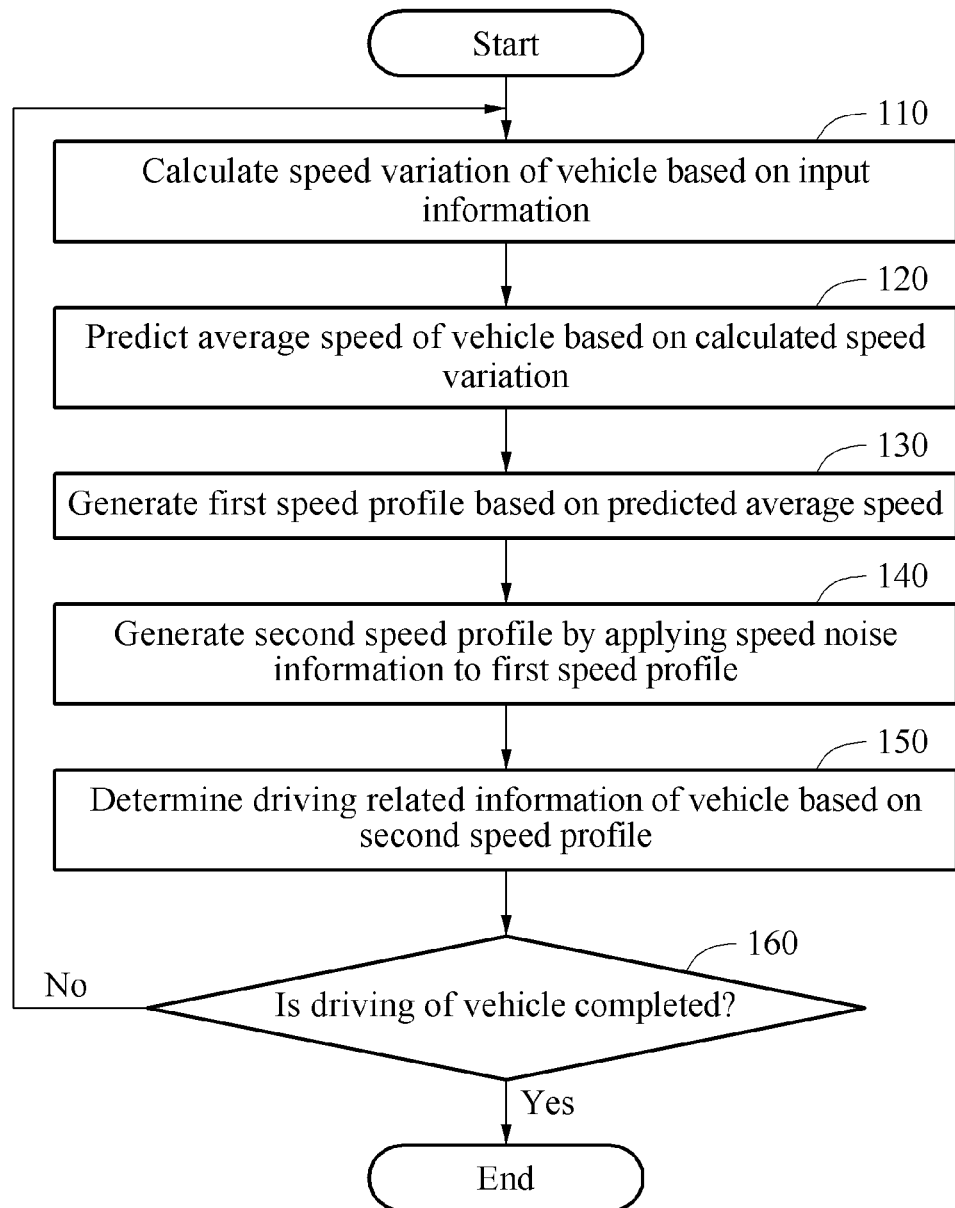
FIG. 1 is a flowchart illustrating an example of an operation of a vehicle control unit (VCU), in accordance with an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. As used herein, the term "and/or" includes any one and any combination of any two or more of the associated listed items.

Unless otherwise defined, all terms including technical and scientific terms used herein have the same meaning as commonly understood after an understanding of the disclosure of this application. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined that detailed description related to a relatively known function or configuration may make the description of the examples unnecessarily ambiguous, the detailed description thereof will be omitted.

FIG. 1 is a flowchart illustrating an example of an operation of a vehicle control unit (VCU), in accordance with an embodiment.

Referring to FIG. 1, in operation 110, a VCU calculates a speed variation of a vehicle based on input information. The VCU calculates a speed variation corresponding to each point on a path on which the vehicle is to be driven based on input information related to each point on the path. The input information includes, for example, weather information, traffic flow information, and road type information.

The speed variation is calculated through a speed variation calculation model. The speed variation will be described further with reference to FIG. 2.

In operation 120, the VCU predicts an average speed of the vehicle based on the calculated speed variation. The VCU predicts an average speed of the vehicle at each point on the path based on a speed variation corresponding to the each point and reference speed information of the each point. For example, the VCU predicts the average speed of the vehicle at each point as "speed variation corresponding to each point+reference speed of each point". If the speed variation corresponding to each point and/or the reference speed of each point differs, the average speed of the vehicle at each point will be different.

In operation 130, the VCU generates a first speed profile based on the predicted average speed. The VCU generates a first speed profile with respect to the path based on the average speed predicted with respect to each point on the path. Since the first speed profile is generated based on the predicted average speed, the first speed profile may not represent acceleration and/or deceleration of the vehicle accurately.

Although not shown in FIG. 1, the VCU may generate speed noise information through a noise generation function. The noise generation function is, for example, a Gaussian function with respect to additive white Gaussian noise (AWGN). However, the noise generation function is not limited thereto.

In operation 140, the VCU generates a second speed profile by applying speed noise information to the first speed profile. The speed noise information may be information to represent acceleration and/or deceleration of the vehicle. Thus, with the addition of the speed noise information, the second speed profile more realistically represents acceleration and/or deceleration of the vehicle similar to an actual speed profile reflecting acceleration and/or deceleration of the vehicle.

The example of generating the first speed profile and the second speed profile will be described further with reference to FIG. 4.

In operation 150, the VCU determines driving related information of the vehicle based on the second speed profile. For example, the VCU predicts an amount of power to be used by the vehicle to reach a destination (or an amount of power required for the vehicle to reach the destination) based on the second speed profile. Accordingly, the prediction accuracy with respect to the amount of power to be used by the vehicle is increased. The amount of power to be used by the vehicle will be described further with reference to FIGS. 5 and 6. In another example, the VCU generates guide information related to driving of the vehicle based on the second speed profile. Thus, the VCU enables a user to use the vehicle more efficiently and to use a battery for a longer time. The guide information will be described further with reference to FIG. 7.

In operation 160, the VCU determines whether driving of the vehicle is completed, such as by determining whether the vehicle has reached a destination.

In a case in which driving of the vehicle is yet to be completed, the VCU operates based on an update period. That is, when the update period arrives, the VCU performs operations 110 through 150. According to one implementation, the update period is modifiable, and the VCU performs operations 110 through 150 at an update request from the user.

In a case in which driving of the vehicle is completed, the VCU terminates its operation.

Figure 2:
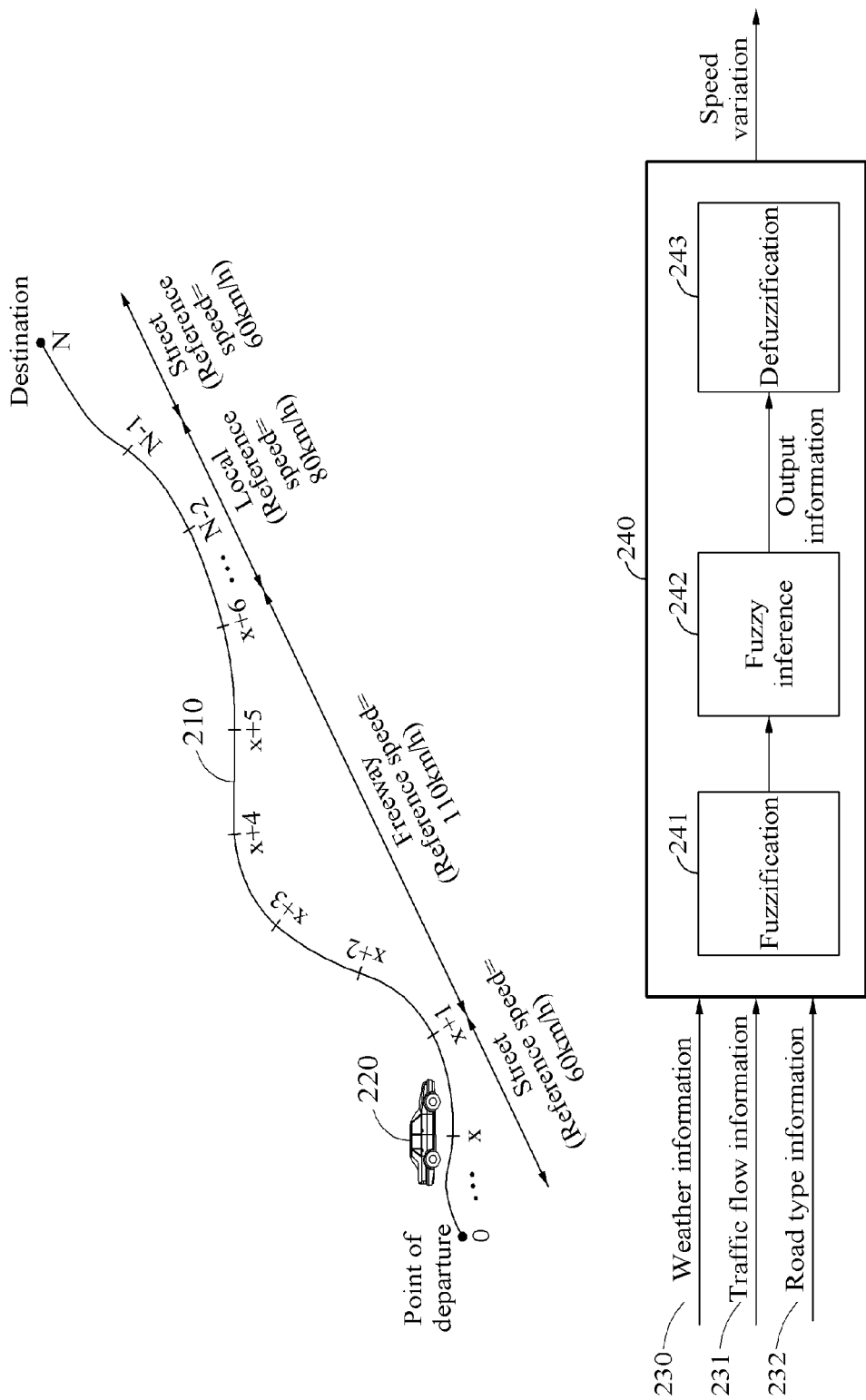
FIG. 2 illustrates an example of calculating a speed variation by a VCU, in accordance with an embodiment.

FIG. 2 illustrates an example of calculating a speed variation by a VCU, in accordance with an embodiment.

Referring to FIG. 2, a path 210 and a vehicle 220 are illustrated.

A VCU (not shown) in the vehicle 220 obtains input information related to each of points, for example, x, x+1, x+2, . . . , and N, on the path 210. The input information includes, for example, one of weather information 230, traffic flow information 231, or road type information 232, or a combination thereof. In other words, the VCU obtains the weather information 230 of each point on the path 210, the traffic flow information 231 of each point on the path 210, and the road type information 232 corresponding to each point. The weather information 230, the traffic flow information 231, and the road type information 232 will be described below.

The weather information 230 includes precipitation information P. The VCU receives precipitation information of each point on the path 210 from an external server, for example, a weather service center server or a precipitation information providing server, through a communication interface. For example, the VCU receives precipitation information such as P=0.2 mm at a point x from the weather service center server.

The traffic flow information 231 includes a traffic index T determined based on a traffic congestion level of the path 210 and a delay time. The VCU receives the traffic congestion level of the path 210 and the delay time from the external server, for example, a traffic information providing server, through the communication interface. The VCU determines the traffic index T based on the traffic congestion level and the delay time. In the example of FIG. 2, the VCU receives a traffic congestion level of each point on the path 210 and a delay time, and determines a traffic index T with respect to each point based on the traffic congestion level of each point and the delay time. The traffic index T is a value within a predetermined range, for example, between 0 and 10. For example, if a traffic congestion level of the point x is 3 between 0 and 4, and a delay time is 10 minutes, the VCU determines a traffic index T with respect to the point x to be "4" by referring to a lookup table. However, in another implementation, rather than calculating the traffic index T, the VCU receives the traffic index T with respect to each point on the path 210 from the external server.

The road type information 232 indicates a road type R to which each point on the path 210 belongs. Road types include, for example, a street, a local road, and a freeway. However, the road types are not limited thereto. In the example of FIG. 2, a road corresponding to the point x is a street, and a road corresponding to a point x+1 is a freeway. The VCU receives the road type information 232 from a navigation system of the vehicle.

Hereinafter, the weather information 230, the traffic flow information 231, and the road type information 232 are expressed as P, T, and R, respectively.

P, T, and R of each point on the path 210 are input into a speed variation calculation model 240. The speed variation calculation model 240 of FIG. 2 is a fuzzy inference system based model. However, the speed variation calculation model 240 is not limited thereto, and may be a model trained through machine learning. For example, the speed variation calculation model 240 may be based on a neural network model, a recurrent neural network (RNN) model, or a long short term memory (LSTM) RNN model.

The speed variation calculation model 240 performs a fuzzification 241 on P, T, and R of each point on the path 210 through membership functions of P, T, and R of each point on the path 210. Hereinafter, the fuzzification 241 will be described further with reference to FIGS. 3A through 3C.

Figure 3A:
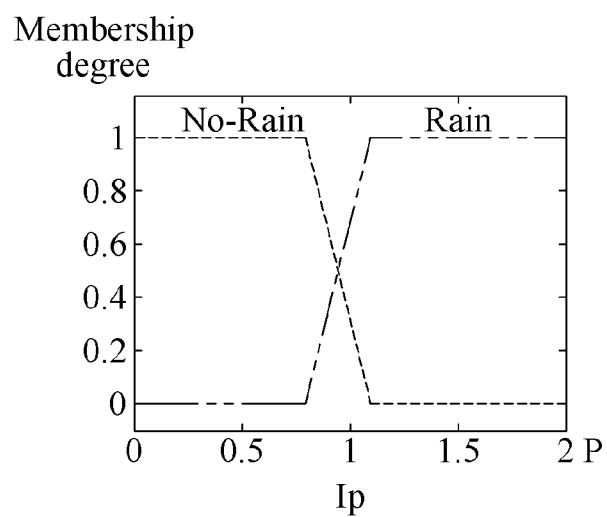
FIGS. 3A, 3B and 3C are graphs illustrating examples of membership functions, in accordance with an embodiment.
Figure 3B:
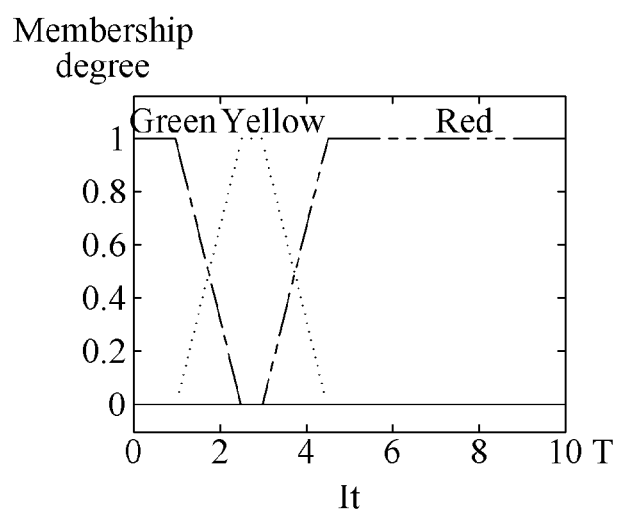
Figure 3C:
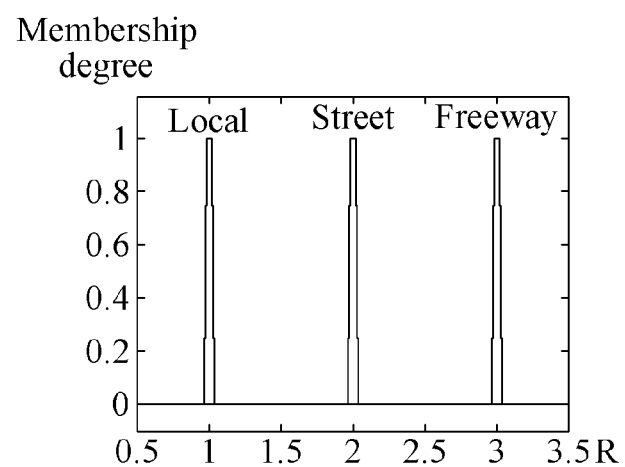

FIGS. 3A through 3C are graphs illustrating examples of membership functions, in accordance with an embodiment.

Referring to FIG. 3A, a membership function of P is illustrated.

The membership function of P is expressed by, for example, Equation 1.

$$\mu_{I_P=NR}(P) = \begin{cases} 1 & \text{if } P < a \\ \dfrac{P-b}{a-b} & \text{if } a \leq P < b \\ 0 & \text{if } P \geq b \end{cases} \quad \text{[Equation 1]}$$

-continued $$\mu_{I_P=WR}(P) = \begin{cases} 0 & \text{if } P < a \\ \dfrac{P-a}{b-a} & \text{if } a \le P < b \\ 1 & \text{if } P \ge b \end{cases}$$

$I_P \in \{NR, WR\}$

In Equation 1, a and b are constants. For example, a=0.8 and b=1.1. However, a and b are not limited thereto, and other constant values may be used without departing from the spirit and intended result of Equation 1.

$\mu_{I_P=NR}(P)$ represents a grade of membership of P to a set corresponding to $I_P$=No Rain (NR). In other words, $\mu_{I_P=NR}(P)$ represents a membership probability of P with respect to the set corresponding to $I_P$=NR. Similarly, $\mu_{I_P=WR}(P)$ represents a membership probability of P with respect to a set corresponding to $I_P$=Rain (WR). For example, in a case in which P=1 with respect to the point x, $\mu_{I_P=NR}(P)$=⅔ and $\mu_{I_P=WR}(P)$=⅓. A fuzzification result with respect to P of the point x indicates that P of the point x belongs to the set corresponding to $I_P$=NR at a probability of ⅔, and belongs to the set corresponding to $I_P$=WR at a probability of ⅓.

Referring to FIG. 3B, a membership function of T is illustrated.

The membership function of T is expressed by, for example, Equation 2.

$$\mu_{I_T=GR}(T) = \begin{cases} 1 & \text{if } T < a_1 \\ \dfrac{T-a_2}{a_1-a_2} & \text{if } a_1 \le T < a_2 \\ 0 & \text{if } T \ge a_2 \end{cases}$$ [Equation 2]

$$\mu_{I_T=YW}(T) = \begin{cases} 0 & \text{if } T < a_1 \\ \dfrac{T-a_1}{a_2-a_1} & \text{if } a_1 \le T < a_2 \\ 1 & \text{if } a_2 \le T < a_3 \\ \dfrac{T-a_4}{a_3-a_4} & \text{if } a_3 \le T < a_4 \\ 0 & \text{if } T \ge a_4 \end{cases}$$

$$\mu_{I_T=RD}(T) = \begin{cases} 0 & \text{if } T < a_3 \\ \dfrac{T-a_3}{a_4-a_3} & \text{if } a_3 \ge T < a_4 \\ 1 & \text{if } T \ge a_4 \end{cases}$$

$I_T \in \{GR, YW, RD\}$

In Equation 2, $a_1$ through $a_4$ are constants. For example, $a_1$=1, $a_2$=2, $a_3$=3.5, and $a_4$=4.5. However, $a_1$ through $a_4$ are not limited thereto.

$\mu_{I_T=GR}(T)$ represents a membership probability of T with respect to a set corresponding to $I_T$=Green (GR), $\mu_{I_T=YW}(T)$ represents a membership probability of T with respect to a set corresponding to $I_T$=Yellow (YW), and $\mu_{I_T=RD}(T)$ represents a membership probability of T with respect to a set corresponding to $I_T$=Red (RD). For instance, GR indicates clear traffic, YW indicates mild traffic, and RD indicates heavy traffic. For example, if T=3 with respect to the point x, T of the point x corresponds to $a_2<T<a_3$, and thus $\mu_{I_T=GR}(T)$=0, $\mu_{I_T=YW}(T)$=1, and $\mu_{I_T=RD}(T)$=0. A fuzzification result with respect to T of the point x indicates that T of the point x belongs to the set corresponding to $I_T$=GR at a probability of 0, belongs to the set corresponding to $I_T$=YW at a probability of 1, and belongs to the set corresponding to $I_T$=RD at a probability of 0.

Referring to FIG. 3C, a membership function of R is illustrated.

The membership function of R is expressed by, for example, Equation 3.

$$\mu_{I_R=LC}(R) = \begin{cases} 1 & \text{if } R = \text{Local} \\ 0 & \text{otherwise} \end{cases}$$ [Equation 3]

$$\mu_{I_R=ST}(R) = \begin{cases} 1 & \text{if } R = \text{Street} \\ 0 & \text{otherwise} \end{cases}$$

$$\mu_{I_R=FW}(R) = \begin{cases} 1 & \text{if } R = \text{Freeway} \\ 0 & \text{otherwise} \end{cases}$$

$I_R \in \{LC, ST, FW\}$

For example, in a case in which R=Street with respect to the point x, a fuzzification result with respect to R of the point x indicates that R of the point x belongs to a set corresponding to $I_R$=Street (ST) at a probability of 1, belongs to a set corresponding to $I_R$=Local (LC) at a probability of 0, and belongs to a set corresponding to $I_R$=Freeway (FW) at a probability of 0.

Referring to FIG. 2 again, when results of the fuzzification 241 with respect to P, T, and R of each point on the path 210 are generated, the speed variation calculation model 240 performs a fuzzy inference 242 based on the results of the fuzzification 241 with respect to P, T, and R of each point on the path 210, fuzzy rules, and output membership functions.

Table 1 lists examples of the fuzzy rules. However, the fuzzy rules are not limited to Table 1.

TABLE 1 r1 = 'If $I_R$ is Local and $I_P$ is No-Rain and $I_T$ is Green then $I_{out}$ is Ic1';
r2 = 'If $I_R$ is Local and $I_P$ is No-Rain and $I_T$ is Yellow then $I_{out}$ is Ic2';
r3 = 'If $I_R$ is Local and $I_P$ is No-Rain and $I_T$ is Red then $I_{out}$ is Ic3';
r4 = 'If $I_R$ is Local and $I_P$ is Rain and $I_T$ is Green then $I_{out}$ is Ic4';
r5 = 'If $I_R$ is Local and $I_P$ is Rain and $I_T$ is Yellow then $I_{out}$ is Ic5';
r6 = 'If $I_R$ is Local and $I_P$ is Rain and $I_T$ is Red then $I_{out}$ is Ic6';
r7 = 'If $I_R$ is Street and $I_P$ is No-Rain and $I_T$ is Green then $I_{out}$ is st1';
r8 = 'If $I_R$ is Street and $I_P$ is No-Rain and $I_T$ is Yellow then $I_{out}$ is st2';
r9 = 'If $I_R$ is Street and $I_P$ is No-Rain and $I_T$ is Red then $I_{out}$ is st3';
r10 = 'If $I_R$ is Street and $I_P$ is Rain and $I_T$ is Green then $I_{out}$ is st4';
r11 = 'If $I_R$ is Street and $I_P$ is Rain and $I_T$ is Yellow then $I_{out}$ is st5';
r12 = 'If $I_R$ is Street and $I_P$ is Rain and $I_T$ is Red then $I_{out}$ is st6';
r13 = 'If $I_R$ is Freeway and $I_P$ is No-Rain and $I_T$ is Green then $I_{out}$ is fw1';
r14 = 'If $I_R$ is Freeway and $I_P$ is No-Rain and $I_T$ is Yellow then $I_{out}$ is fw2';
r15 = 'If $I_R$ is Freeway and $I_P$ is No-Rain and $I_T$ is Red then $I_{out}$ is fw3';
r16 = 'If $I_R$ is Freeway and $I_P$ is Rain and $I_T$ is Green then $I_{out}$ is fw4';
r17 = 'If $I_R$ is Freeway and $I_P$ is Rain and $I_T$ is Yellow then $I_{out}$ is fw5';
r18 = 'If $I_R$ is Freeway and $I_P$ is Rain and $I_T$ is Red then $I_{out}$ is fw6';

The output membership functions are, for example, Gaussian functions. Equation 4 is an example of the output membership functions. However, the output membership functions are not limited to Equation 4.

$$f(x \mid m, \sigma) = \dfrac{1}{\sigma\sqrt{2\pi}} e^{-\dfrac{(x-m)^2}{2\sigma^2}}$$ [Equation 4]

In Equation 4, x is a variable. m and σ are constants.

The number of the output membership functions corresponds to the number of the fuzzy rules. For example, the number of the output membership functions with respect to the 18 fuzzy rules of Table 1 is 18, as expressed below.

{lc1,lc2,lc3,lc4,lc5,lc6,st1,st2,st3,st4,st5,st6,fw1,fw2, fw3,fw4,fw5,fw6}

The speed variation calculation model 240 performs the fuzzy inference 242 by applying a Mamdani type method to the results of the fuzzification 241 with respect to P, T, and R of each point on the path 210, the fuzzy rules, and the output membership functions. The Mamdani type method is only an example of the fuzzy inference 242, and the fuzzy inference 242 is not limited thereto.

Output information corresponding to the results of the fuzzification 241 is generated through the fuzzy inference 242.

The speed variation calculation model 240 performs a defuzzification 243 on the output information. For example, the speed variation calculation model 240 performs the defuzzification 243 on the output information through a center of gravity. The center of gravity is only an example of the defuzzification 243, and the defuzzification 243 is not limited thereto.

The speed variation calculation model 240 calculates a speed variation corresponding to each point on the path 210 by performing the defuzzification 243 on the output information.

The VCU determines the speed variation corresponding to each point on the path 210 to be a positive value or a negative value, by referring to driving history information of the vehicle. The driving history information includes, for example, a driving pattern and a previous speed profile. For example, the VCU determines whether a driver mostly drives at a low speed, for example, 20 kilometers per hour (km/h) to 50 km/h or at a medium speed, for example, 50 km/h to 70 km/h, through the driving history information. If the driver mostly drives at the low speed or the medium speed, the VCU determines the speed variation to be a negative number. If the driver mostly drives at a high speed, for example, greater than 70 km/h, the VCU determines the speed variation to be a positive number.

Table 2 shows examples of input information related to each point on the path 210 and a speed variation corresponding to each point on the path 210. Here, it is assumed that the VCU determines the speed variation corresponding to each point on the path 210 to be a negative value.

TABLE 2

| Point | Input information | Speed variation (km/h) |
|---|---|---|
| x | $P_x = 1$, $T_x = 3$, $R_x =$ Street | −5 |
| x + 1 | $P_{x+1} = 1$, $T_{x+1} = 4$, $Rx_{+1} =$ Freeway | −10 |
| x + 2 | $P_{x+2} = 1$, $T_{x+2} = 4$, $R_{x+2} =$ Freeway | −10 |
| x + 3 | $P_{x+3} = 1.1$, $T_{x+3} = 4$, $R_{x+3} =$ Freeway | −10 |
| x + 4 | $P_{x+4} = 1.1$, $Tx_{+4} = 4$, $R_{x+4} =$ Freeway | −10 |
| x + 5 | $P_{x+5} = 0.95$, $T_{x+5} = 4$, $R_{x+5} =$ Freeway | −10 |
| . . . | . . . | . . . |
| N − 1 | $P_{N−1} = 1$, $T_{N−1} = 5$, $R_{N−1} =$ Local | −20 |
| N | $P_N = 1.5$, $T_N = 7$, $R_N =$ Street | −40 |

The VCU generates a first speed profile based on the speed variation corresponding to each point on the path 210, and generates a second speed profile by applying speed noise information to the first speed profile. Hereinafter, the example of generating the first speed profile and the second speed profile will be described with reference to FIG. 4.

FIG. 4 illustrates an example of generating a first speed profile and a second speed profile by a VCU, in accordance with an embodiment.

Referring to FIG. 4, a path 410 and a vehicle 420 are illustrated.

As described above, a VCU predicts an average speed of the vehicle 420 at each point on the path 410 based on a speed variation corresponding to each point on the path 410 and a reference speed of each point on the path 410. Table 3 shows an example of the average speed predicted with respect to each point on the path 410.

TABLE 3

| Point | Speed variation (km/h) | Reference speed (km/h) | Average speed (km/h) |
|---|---|---|---|
| x | −5 | 60 | 55 |
| x + 1 | −10 | 110 | 100 |
| x + 2 | −10 | 110 | 100 |
| x + 3 | −10 | 110 | 100 |
| x + 4 | −10 | 110 | 100 |
| x + 5 | −10 | 110 | 100 |
| . . . | . . . | . . . | . . . |
| N − 1 | −20 | 60 | 40 |
| N | −40 | 60 | 20 |

The VCU generates a first speed profile 430 based on the average speed predicted with respect to each point on the path 410.

The VCU generates a second speed profile 440 by applying speed noise information to the first speed profile 430.

In the example of FIG. 4, it may be assumed that an accident occurs between a point x+5 and a point x+6. Traffic flow information of the point x+6 indicates congestion. When the VCU obtains input information including the traffic flow information of the point x+6 at a current position of the vehicle 420, the VCU calculates the speed variation of each point. For instance, the VCU calculates the speed variation of the point x+6 at −90 km/h based on the traffic flow information of the point x+6. The VCU predicts the average speed of the vehicle 420 at each point. Here, the VCU predicts an average speed at the point x+6 at 20 km/h. The VCU generates the first speed profile 430 based on the average speed predicted with respect to each point, and generates the second speed profile 440 by applying the speed noise information to the first speed profile 430. Thus, the second speed profile 440 reflects real-time traffic flow information.

Figure 5:
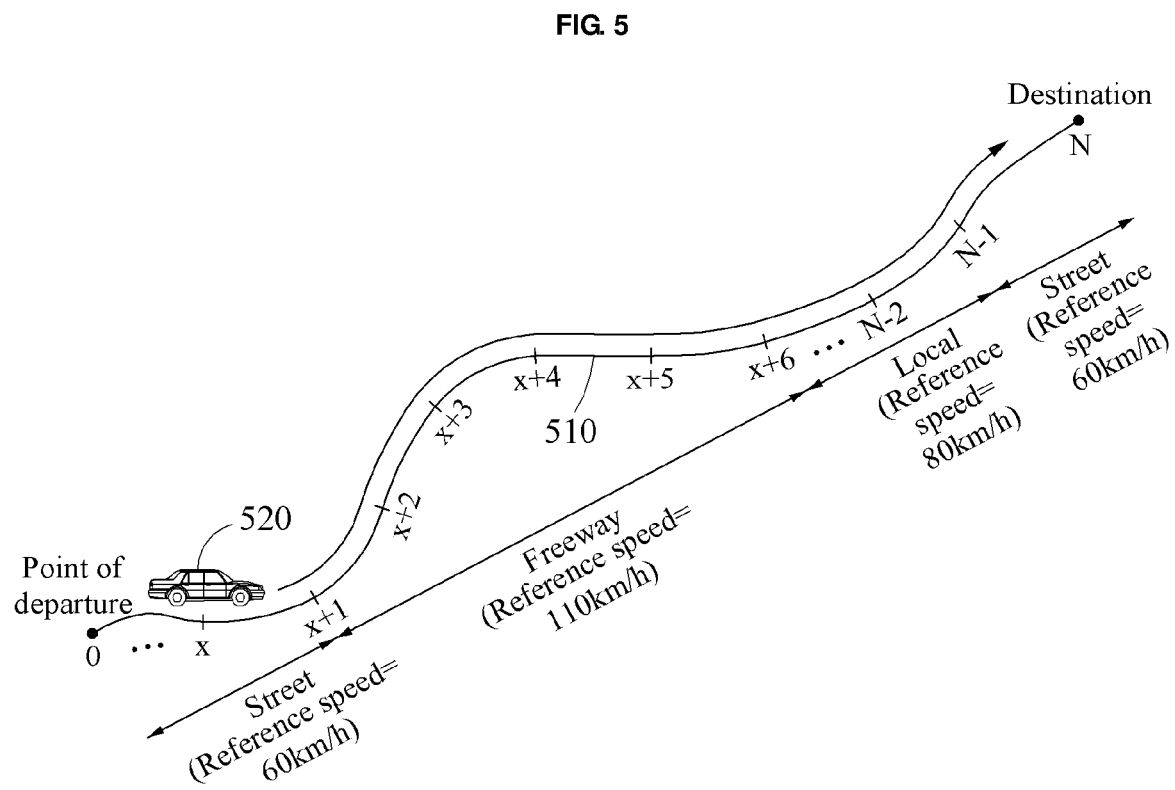
FIGS. 5 and 6 illustrate examples of driving related information generated based on a second speed profile, in accordance with an embodiment.
Figure 6:
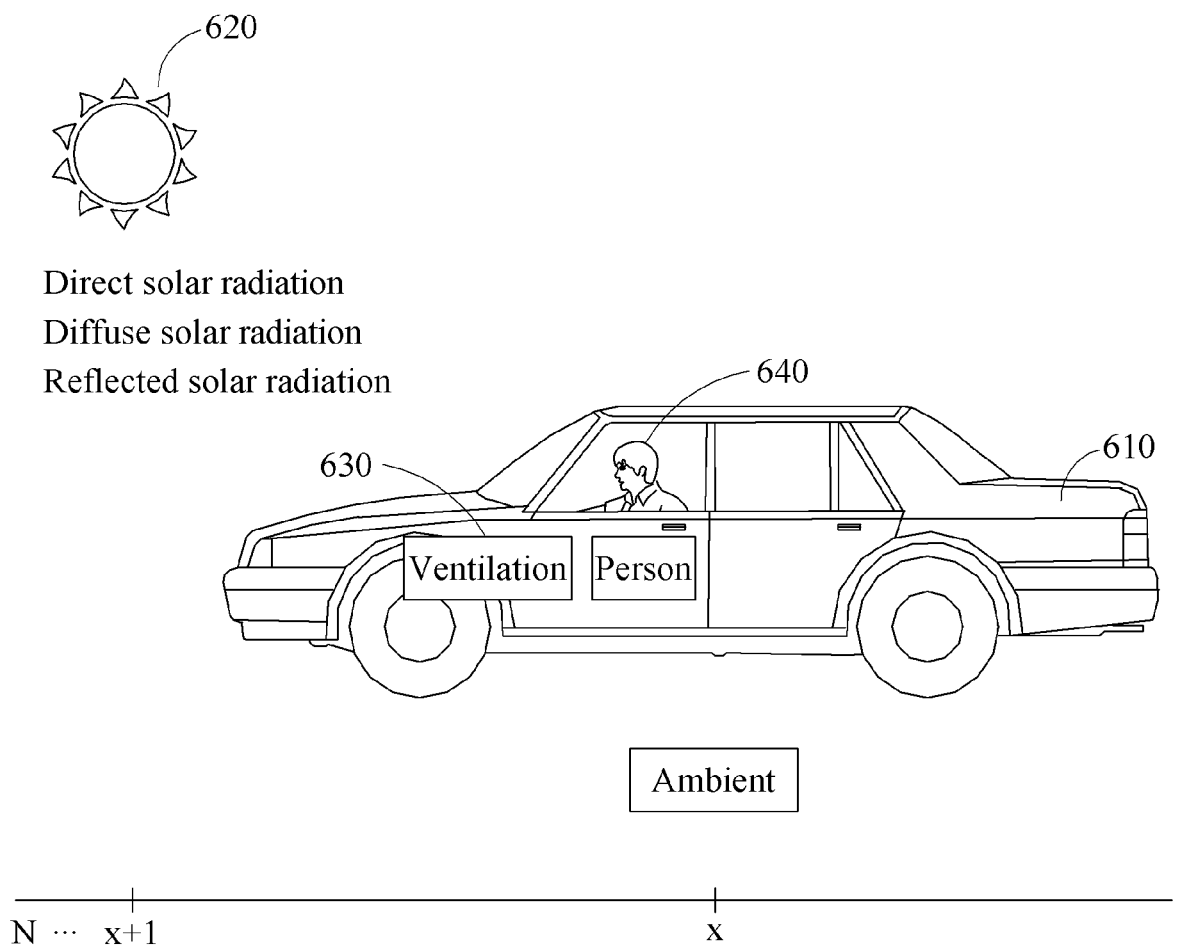

FIGS. 5 and 6 illustrate examples of driving related information generated based on a second speed profile, in accordance with an embodiment.

An example of driving related information indicates an amount of power to be used by a vehicle during driving.

In an example, the amount of power to be used by the vehicle during driving includes $E_{PT}(t)$ and/or $E_{HVAC}(t)$. $E_{PT}(t)$ denotes a predicted amount of power to be transferred from a battery pack of the vehicle to a powertrain during driving of the vehicle, and $E_{HVAC}(t)$ denotes a predicted amount of power to be used by an air conditioning system of the vehicle during driving of the vehicle. However, the amount of power to be used by the vehicle during driving may additionally be calculated with respect to further variables, such as a predicted amount of power to be used by windshield wipers, a predicted amount of power to be used by a heating system of the vehicle, or a predicted amount of power used by the vehicle in consideration of a use of cruise control during driving.

Hereinafter, $E_{PT}(t)$ will be described with reference to FIG. 5, and $E_{HVAC}(t)$ will be described with reference to FIG. 6.

Referring to FIG. 5, a vehicle 520 is driven along a path 510.

It is assumed that the vehicle 520 is passing a current point x. The VCU calculates $E_{PT}(T)$ based on a second speed profile. For example, the VCU calculates $E_{PT}(t)$ by applying the second speed profile to a power consumption calculation function. That is, the VCU predicts an amount of power to be used by the vehicle 520 for driving from the current point x to a destination as $E_{PT}(t)$. The power consumption calculation function will be described below.

Further, the VCU calculates $E_{PT}(t)$ further based on a predicted value with respect to at least one of a wind direction, a wind speed, or an altitude of a following point. A predicted value with respect to the wind direction and the wind speed of the following point is calculated based on wind direction information and wind speed information of the current point, and a predicted value with respect to the altitude of the following point is calculated based on altitude information of the current point. The VCU calculates $E_{PT}(t)$ as expressed by, for example, Equation 5.

$$E_{PT}(t) = \sum_{i=x+1}^{N} f_{i,t}^{pt}(g_{i,t}, \hat{W}_{i,t}, \hat{El}_{i,t}) \quad \text{[Equation 5]}$$

In Equation 5, $g_{i,t}$ denotes a speed of a vehicle at a following point i, calculated at a time t. That is, $g_{i,t}$ denotes the second speed profile described above. $\hat{W}_{i,t}$ denotes a predicted value with respect to a wind direction and a wind speed of the following point i, calculated at the time t. $\hat{El}_{i,t}$ denotes a predicted value with respect to an altitude of the following point i, calculated at the time t. $f_{i,t}^{pt}(\ )$ denotes a power consumption calculation function. For example, $f_{i,t}^{pt}(\ )$ denotes a function to calculate an amount of power to be transferred to a powertrain in a section between a current point i-1 and the following point i.

In the example of FIG. 5, the VCU calculates, at a point x, at least one of a wind direction (predicted value), a wind speed (predicted value), or an altitude (predicted value) of a point x+1. The VCU calculates a predicted amount of power to be transferred to the powertrain in a section between the point x and the point x+1 by applying a speed (predicted value) of the vehicle at the point x+1 and at least one of the wind direction (predicted value), the wind speed (predicted value), or the altitude (predicted value) of the point x+1 to $f_{i,t}^{pt}(\ )$. The VCU calculates a predicted amount of power to be transferred to the powertrain, with respect to another section. The VCU calculates $E_{PT}(t)$ by summing up the predicted values calculated with respect to respective sections, for example, between x and x+1, x+1 and x+2, ..., N-1 and N.

According to another implementation, the VCU further considers various variables to increase the accuracy of $E_{PT}(t)$. For example, the VCU calculates $E_{PT}(t)$ as expressed by Equation 6.

$$E_{PT}(t) = \sum_{i=x+1}^{N} f_{i,t}^{pt}(g_{i,t}(u_x^s, \hat{u}_{i,t}^s, h_C(\hat{u}_{i,t}), h_p(\hat{u}_{i,t})), \hat{W}_{i,t}, \hat{El}_{i,t}) \quad \text{[Equation 6]}$$

where $u_x^s = \{L_x, F_x, C_x, W_x, P_x, S_x\}$

Table 4 shows descriptions of variables and functions of Equation 6.

TABLE 4

| | Description |
|---|---|
| $L_i$ | Reference speed of point i |
| $F_i$ | Driving speed at point i |
| $El_i$ | Altitude of point i |
| $C_i$ | Precipitation of point i |
| $W_i$ | Wind speed/wind direction of point i |
| $P_i$ | Instant power transferred to powertrain at point i |
| $S_i$ | State of charge (SOC) calculated at point i |
| $u_i^s$ | Speed related information at point i |
| $\hat{u}_{i,t}$ | Predicted value calculated at time t |
| $h_c(\ )$ | Driving record function for each road type |
| $h_p(\ )$ | Driving record function for each driver |
| $g_{i,t}(\ )$ | Function to calculate predicted value of speed of vehicle at point i |
| $f_{i,t}^{pt}(\ )$ | Power consumption calculation function |

In Equation 6, speed related information $u_x^s$ at the current point x includes a reference speed $L_x$ at the current point x, a driving speed $F_x$ of the vehicle 520 at the current point x, a precipitation $C_x$ of the current point x, a wind speed/wind direction $W_x$ of the current point x, an amount of instant power $P_x$ transferred to the powertrain at the current point x, and a state of charge (SOC) $S_x$ at the current point x. However, the speed related information is not limited thereto. According to another implementation, $u_x^s$ may include any one or any combination of two or more of the reference speed at the current point x, the driving speed of the vehicle 520 at the current point x, the precipitation of the current point x, the wind speed/wind direction of the current point x, the amount of instant power transferred to the powertrain at the current point x, or the SOC at the current point x.

In Equation 6, $\hat{u}_{i,t}^s$ denotes a predicted value calculated at a current time T with respect to speed related information at the following point i. For example, $\hat{u}_{i,t}^s$ includes a predicted value calculated at the time t with respect to at least one of a precipitation of the following point i, a driving speed of the vehicle 520 at the following point i, a wind speed/wind direction of the following point i, an amount of instant power to be transferred to the powertrain at the following point i, or an SOC at the following point i.

In Equation 6, $\hat{u}_{i,t}$ includes at least one of information in $\hat{u}_{i,t}^s$ or information in $\hat{u}_{i,t}^w$ which will be described with reference to FIG. 6.

In Equation 6, driving records stored for each road type and each driver are used to calculate a predicted value with respect to a speed of the vehicle 520 at the following point i. In particular, the VCU stores the driving records of the vehicle 520 for each road type, and generates a driving record function $h_c(\ )$ for each road type. For example, the VCU generates a driving record function with respect to a street, a driving record function with respect to a freeway, and a driving record function with respect to a local road. Further, the VCU stores driving records of the vehicle 520 for each driver, and generates a driving record function $h_p(\ )$ for each driver. The VCU uses $h^c(\ )$ and $h_p(\ )$ to calculate a predicted value with respect to the speed of the vehicle 520 at the following point i.

In Equation 6, $\hat{W}_{i,t}$ denotes a predicted wind speed/wind direction calculated at a current time T at the point i, and $\hat{El}_{i,t}$ denotes a prediction altitude calculated at a current time T at the point i.

In the example of FIG. 5, the VCU calculates a predicted value with respect to the speed of the vehicle 520 at the following point i, that is, the point x+1 by applying the speed related information $u_x^s$ at the point x, the predicted value $\hat{u}_{i,t}^s$ with respect to the speed related information at the point x+1, driving records with respect to a freeway to which the point x+1 belongs, and the driving records with respect to a current driver to $g_{i,t}()$. Since the various variables are applied to $g_{i,t}()$, the speed of the vehicle 520 at the point x+1 may be predicted more accurately.

Further, the VCU calculates a predicted amount of power to be transferred to the powertrain in a section between x and x+1 by applying the predicted value with respect to the speed of the vehicle 520 at the point x+1 and at least one of the wind direction (predicted value), the wind speed (predicted value), or the altitude (predicted value) at the point x+1 to $f_{i,t}^{pt}()$. Similarly, the VCU calculates a predicted amount of power to be transferred to the powertrain with respect to another section. The VCU calculates $E_{PT}(t)$ by summing up predicted values calculated with respect to respective sections, for example, between x and x+1, x+1 and x+2, ..., N−1 and N. $E_{PT}(t)$ is calculated in view of various environment variables, and thus the accuracy of $E_{PT}(t)$ increases.

The vehicle 520 may operate an air conditioning system. As the air conditioning system is operated, an amount of power to be used by the vehicle 520 increases. Thus, if $E_{HVAC}(t)$, an amount of power to be used by the air conditioning system during driving of the vehicle 520, is predicted, the prediction accuracy with respect to the amount of power to be used by the vehicle 520 further increases. Hereinafter, the example of calculating $E_{HVAC}(t)$ will be described below with reference to FIG. 6.

Referring to FIG. 6, a vehicle 610 and the sun 620 are illustrated.

It is assumed that the vehicle 610 is passing a current point x.

Solar radiation and ambient temperature of the vehicle 610 influence an amount of power to be used by an air conditioning system. The VCU calculates $E_{HVAC}(t)$ based on at least one of solar radiation information or ambient temperature information. For example, the VCU calculates a predicted value with respect to weather related information of a following point, for example, a point x+1, based on weather related information of the current point x, and calculates $E_{HVAC}(t)$ based on the weather related information of the current point x and the predicted value with respect to the weather related information of the following point x+1. The weather related information includes, for example, ambient temperature, and an azimuth and solar radiation of the sun 620. The VCU calculates $E_{HVAC}(t)$ as expressed by, for example, Equation 7.

$$E_{HVAC}(t) = \sum_{i=x+1}^{N} f_{i,t}^{aux}(u_x^w, \hat{u}_{i,t}^w) \text{ where} \quad \text{[Equation 7]}$$

$$u_x^w = \{T_x, R_x\}$$

Table 5 represents descriptions of variables and a function of Equation 7.

TABLE 5

| | Description |
|---|---|
| $T_i$ | Ambient temperature of point i |
| $R_i$ | Solar azimuth and radiation amount at point i |
| $u_i^w$ | Weather related information at point i |
| $f_{i,t}^{aux}()$ | Auxiliary power consumption calculation function |

$f_{i,t}^{aux}()$ denotes an auxiliary power consumption calculation function. For example, $f_{i,t}^{aux}()$ is a function to calculate a predicted value with respect to an amount of auxiliary power to be used in a section between a point i−1 and a point i, for example, an amount of power to be used by the air conditioning system.

In the example of FIG. 6, the VCU calculates the predicted amount of power to be used by the air conditioning system in the section between x and x+1 by applying ambient temperature of the vehicle 610 at the point x, an azimuth of the sun 620 at the point x, an amount of solar radiation at the point x, ambient temperature (predicted value) of the vehicle 610 at the point x+1, an azimuth (predicted value) of the sun 620 at the point x+1, and an amount of solar radiation (predicted value) at the point x+1 to $f_{i,t}^{aux}()$. The VCU calculates a predicted value with respect to an amount of power to be used by the air conditioning system with respect to another section. The VCU calculates $E_{HVAC}(t)$ by summing up predicted values with respect to respective sections, for example, between x and x+1, x+1 and x+2, ..., N−1 and N.

According to implementation, the VCU further considers heat generated in a cabin of the vehicle 610 to increase the accuracy of $E_{HVAC}(t)$, which will be described further below.

Heat is generated in the cabin of the vehicle 610 by various causes. For example, heat is generated in the cabin of the vehicle 610 by at least one of direct solar radiation, diffuse solar radiation, reflected solar radiation, an ambient environment of the vehicle 610, ventilation 630, or a person 640, for example, a driver and/or a passenger.

Table 6 lists types of heat generated in the cabin of the vehicle 610 and Q.

TABLE 6

| Heat by direction radiation | $\dot{Q}_1 = \sum_{i=0}^{Surfaces} S \times \tau \times I_{Dir} \times \cos\theta$ |
|---|---|
| | S = surface area (m²) |
| | T = surface element transmissivity |
| | $I_{Dir}$ = direct radiation (W/m²) |
| | $I_{Dir} = A/\exp\left(\frac{B}{\sin(\beta)}\right)$, A = 1018, B = 0.207, and $\beta$ = altitude angle of the sun |
| | $\theta$ = sun angle |

TABLE 6-continued

| Heat by diffuse radiation | $\dot{Q}_2 = \sum_{1=0}^{Surfaces} S \times \tau \times I_{Diff} \times \cos\theta$ |
|---|---|
| | $I_{Diff}$ = diffuse radiation (W/m$^2$) |
| | $I_{Diff} = C \times I_{Dir} \times \frac{1+\cos\varphi}{2}$ C = 0.136 and $\varphi$ = angle with the horizontal surface, that is, angle between horizontal surface at the position of vehicle and the sky |
| Heat by reflected radiation | $\dot{Q}_3 = \sum_{1=0}^{Surfaces} S \times \tau \times I_{Ref} \times \cos\theta$ |
| | $I_{Ref}$ = reflected radiation (W/m$^2$) |
| | $I_{Ref} = (I_{Dir} + I_{Diff}) \times \rho_g \times \frac{1-\cos\varphi}{2}, \rho_g = 0.2$ (ground reflectivity coefficient) |
| Heat by ambient environment | $\dot{Q}_4 = \Sigma_{1=0}^{Surfaces} S \times U \times (T_s - T)$<br>U = heat transfer coefficient (W/m$^2$ – K), $10 \le U \le 100$<br>$T_s$ = surface temperature<br>T = cabin temperature |
| Heat by ventilation | $\dot{Q}_5 = \dot{m}_{vent} \times c_p \times (T_{init} - T)$<br>$\dot{m}_{vent}$ = ventilation mass flow rate (m$^3$/s)<br>$c_p$ = specific heat = 1005<br>$T_{init}$ = initial cabin temperature<br>T = cabin temperature |
| Heat by person | $\dot{Q}_6 = \Sigma_{i=0}^{Persons} H_{pr} \times A_{Du}$<br>$H_{pr}$ = heat production rate (W/m$^2$) = 58.2<br>$H_{pr}$ includes $H_{pr}$ = 85 for the driver and $H_{pr}$ = 55 for the passenger.<br>$A_{Du}$ = Du Bois area (m$^2$)<br>Average Du Bois area of Adult = 1.8 m$^2$<br>More accurately, the Du Bois area is as follows.<br>$A_{Du} = 0.202 \times W^{0.425} \times H^{0.725}$. Here, W = weight, H = height. |

The cabin temperature (or the temperature of driver seat) is determined based on Equation 8.

$$m \times C_{room} \times \frac{dT}{dt} = \dot{Q}_1 + \dot{Q}_2 + \dot{Q}_3 + \dot{Q}_4(T) + \dot{Q}_5(T) + \dot{Q}_6 \quad \text{[Equation 8]}$$

In Equation 8, m denotes a mass of the air, and $C_{room}$ denotes a specific heat of the air.

If a heat transfer efficiency is considered in Equation 8, an amount of power or energy required to maintain an optimal cabin temperature is deduced. The deduced amount of power represents $E_{HVAC}(t)$.

In an example, the VCU predicts the amount of power to be used by the vehicle 610 as $E_{PT}(t)+E_{HVAC}(t)$. That is, the VCU predicts an amount of power to be used by the vehicle 610 for driving from the current point x to a destination as $E_{PT}(t)+E_{HVAC}(t)$.

The VCU determines a driving range of the vehicle 610 based on the predicted amount of power. Here, the predicted amount of power corresponds to $E_{PT}(t)$ or $E_{PT}(t)+E_{HVAC}(t)$. However, the predicted amount of power is not limited thereto. Hereinafter, an example of determining the driving range of the vehicle 610 will be described.

The VCU determines the driving range of the vehicle 610 based on the predicted amount of power and current state information, for example, an SOC, of a battery. The VCU predicts an SOC at a destination by deducting an SOC corresponding to the predicted amount of the power from the current SOC. In other words, the VCU predicts a residual SOC corresponding to an SOC when the vehicle 610 reaches the destination. If the SOC at the destination is less than a predetermined criterion, for example, a value within 0 to 1%, the VCU determines that the vehicle 610 is unable to reach the destination with the current SOC. In this example, the VCU displays information related to a charging station located on a path through a display of the vehicle 610. If the SOC at the destination is greater than or equal to the predetermined criterion, the VCU displays a message indicating that the vehicle 610 is able to reach the destination with the current SOC on the display. Further, if the SOC at the destination is greater than or equal to the predetermined criterion, the VCU determines whether the vehicle 610 is able to perform a round trip with the current SOC. If the vehicle 610 is unable to perform a round trip with the current SOC, the VCU displays information related to a charging station located on a return path through the display.

According to another implementation, the VCU predicts an amount of fuel to be used by the vehicle 610 based on a second speed profile. The VCU determines the driving range of the vehicle 610 based on the predicted amount of fuel and a current amount of fuel. For example, the VCU predicts an amount of fuel at the destination by deducting the predicted amount of fuel from the current amount of fuel. If the amount of fuel at the destination is less than a predetermined criterion, for example, a value within 0 to 1 liter (L), the VCU determines that the vehicle 610 is unable to reach the destination with the current amount of fuel. If the vehicle 610 is unable to reach the destination with the current amount of fuel, the VCU displays a message indicating refueling is required and/or gas station information, for example, gas station location information, on the display. If the amount of fuel at the destination is greater than or equal to the predetermined criterion, the VCU determines whether the vehicle 610 is able to perform a round trip with the current amount of fuel. If the vehicle 610 is unable to perform a round trip with the current amount of fuel, the VCU displays information related to a gas station located on a return path through the display.

Figure 7:
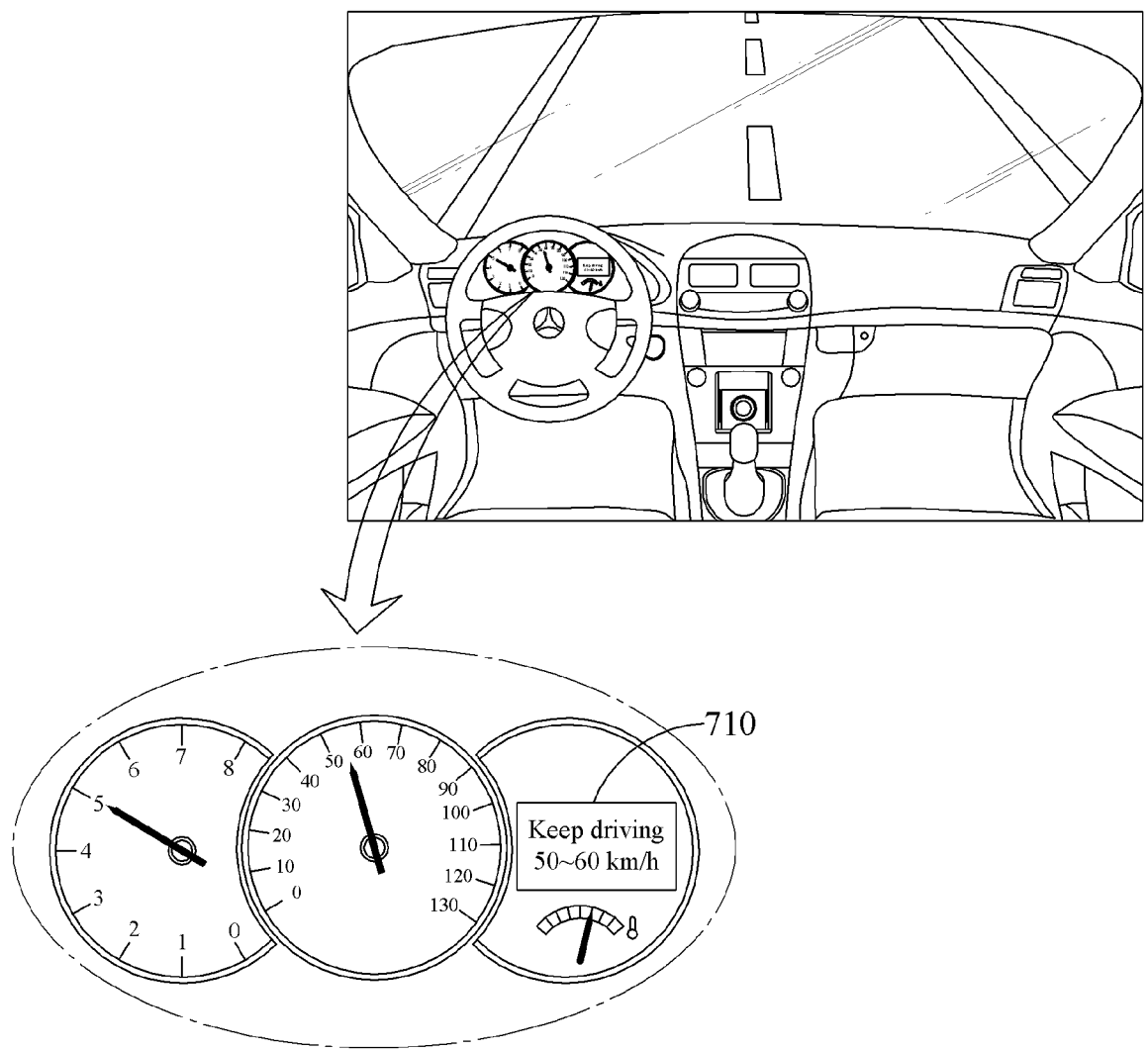
FIG. 7 illustrates an example of driving related information generated based on a second speed profile, in accordance with an embodiment.

FIG. 7 illustrates an example of driving related information generated based on a second speed profile, in accordance with an embodiment.

Another example of driving related information is guide information related to driving.

A VCU generates guide information 710 based on a second speed profile, and displays the guide information 710 on a display.

The VCU deduces a predicted average speed in a section following a current driving section from the second speed profile. For example, when a vehicle is currently being driven in a first section of a freeway, the VCU deduces a predicted average speed in a section following the first section of the freeway from the second speed profile. Referring to the example of FIG. 4, when the vehicle is driven in a section between x+1 and x+2 of the freeway, the VCU deduces a predicted average speed in a section, for example, between x+2 and x+3 or between x+2 and x+6, following the section between x+1 and x+2. Further, the VCU deduces a target speed with respect to the current driving section from driving history information, for example, a previous speed profile, a charge and discharge count of a battery, and an accident history. For example, the VCU deduces a target speed with respect to the freeway through the driving history information. The VCU compares the predicted average speed to the target speed. If the predicted average speed is greater than the target speed, the VCU generates guide information 710 including information related to speed decrease and the target speed. If the predicted average speed is less than or equal to the target speed, the VCU generates guide information 710 related to maintenance of the current driving speed.

The VCU identifies a speed section satisfying a predetermined criterion in the second speed profile. The speed section satisfying the predetermined criterion includes, for example, a speed section that influences a battery life. A deterioration speed of the battery life accelerates by sudden acceleration and/or sudden deceleration of the vehicle. Accordingly, the speed section that influences the battery life is a section in which sudden acceleration or sudden deceleration of the vehicle is expected. However, the speed section that influences the battery life is not limited thereto. The VCU generates guide information 710 related to driving on a path corresponding to the identified speed section. For example, the VCU displays guide information 710 indicating that safe driving is needed on the path corresponding to the identified speed section through a display. Thus, the VCU guides driving suitable for a battery life state.

The description provided with reference to FIGS. 1 through 6 are applicable to FIG. 7, and thus duplicated descriptions will be omitted herein for conciseness.

Figure 8:
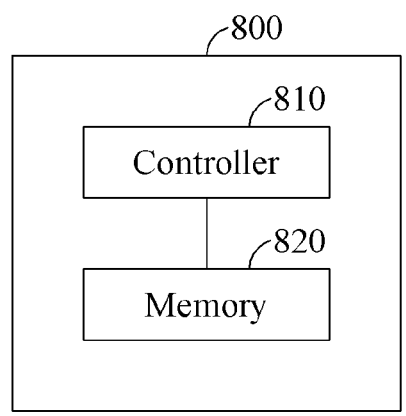
FIG. 8 is a block diagram illustrating an example of a VCU, in accordance with an embodiment.

FIG. 8 is a block diagram illustrating an example of a VCU in accordance with an embodiment.

Referring to FIG. 8, a VCU 800 includes a controller 810 and a memory 820.

The controller 810 calculates a speed variation of a vehicle based on input information.

The controller 810 predicts an average speed of the vehicle based on the calculated speed variation.

The controller 810 generates a first speed profile based on the predicted average speed.

The controller 810 generates a second speed profile by applying speed noise information to the first speed profile.

The memory 820 stores at least one instruction associated with the operation of the controller 810. Further, the memory 820 stores the speed variation calculation model 240 of FIG. 2.

The description provided with reference to FIGS. 1 through 7 are applicable to FIG. 8, and thus duplicated descriptions will be omitted herein for conciseness.

The apparatuses, units, modules, devices, controllers, and other components in FIG. 8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 1 that performs the operations described in this application is performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of operating a vehicle control unit (VCU), the method comprising:
    calculating a speed variation of a vehicle based on input information;
    predicting an average speed of the vehicle based on the calculated speed variation;
    generating a first speed profile based on the predicted average speed;
    generating a second speed profile by applying speed noise information to the first speed profile; and
    determining driving related information of the vehicle based on the second speed profile.

2. The method of claim 1, wherein the calculating comprises calculating a speed variation corresponding to each point on a path of the vehicle based on respective input information associated with the each point.

3. The method of claim 1, wherein the input information comprises any one or any combination of weather information, traffic flow information, or road type information.

4. The method of claim 1, wherein the predicting comprises predicting an average speed of the vehicle at each point on a path of the vehicle based on a speed variation corresponding to the each point and a reference speed of the each point.

5. The method of claim 1, wherein the generating of the first speed profile comprises generating the first speed profile based on an average speed predicted for each point on a path of the vehicle.

6. The method of claim 1, wherein the determining driving related information comprises:
    predicting an amount of power to be used by the vehicle based on the second speed profile.

7. The method of claim 1, wherein the determining driving related information comprises:
    predicting an amount of power to be transferred to a powertrain of the vehicle based on the second speed profile; and
    predicting an amount of power to be used by an air conditioning system of the vehicle based on either one or both of solar radiation information or ambient temperature information.

8. The method of claim 1, further comprising:
    determining a driving range of the vehicle based on a predicted amount of power to be used by the vehicle and either one or both of current state information of a battery of the vehicle or a current amount of fuel of the vehicle.

9. The method of claim 8, wherein the determining of the driving range comprises:
predicting either one or both of state information of the battery or an amount of fuel at a destination based on the predicted amount of power to be used by the vehicle; and
determining whether the vehicle is able to reach the destination based on either one or both of the predicted state information or the predicted amount of fuel.

10. The method of claim 1, wherein the determining driving related information comprises:
generating guide information related to driving of the vehicle based on the second speed profile; and
outputting the guide information to a user of the vehicle.

11. The method of claim 10, wherein the generating of the guide information comprises:
comparing a predicted average speed determined from the second speed profile to a target speed determined from driving history information of the vehicle; and
generating the guide information based on a result of the comparing.

12. The method of claim 10, wherein the generating of the guide information comprises:
identifying a speed section satisfying a predetermined criterion in the second speed profile; and
generating the guide information related to driving on a path corresponding to the identified speed section.

13. A vehicle control unit (VCU), comprising:
a processor configured to
calculate a speed variation of a vehicle based on input information,
predict an average speed of the vehicle based on the calculated speed variation,
generate a first speed profile based on the predicted average speed,
generate a second speed profile by applying speed noise information to the first speed profile, and
determine driving related information of the vehicle based on the second speed profile.

14. The VCU of claim 13, wherein the processor is configured to calculate a speed variation corresponding to each point on a path of the vehicle based on input information associated with the each point.

15. The VCU of claim 13, wherein the input information comprises any one or any combination of any two or more of weather information, traffic flow information, or road type information.

16. The VCU of claim 13, wherein the processor is configured to predict an average speed of the vehicle at each point on a path of the vehicle based on a speed variation corresponding to the each point and a reference speed of the each point.

17. The VCU of claim 13, wherein the processor is configured to generate the first speed profile based on an average speed predicted for each point on a path of the vehicle.

18. The VCU of claim 13, wherein the determining of the driving related information comprises predicting an amount of power to be used by the vehicle based on the second speed profile.

19. The VCU of claim 13, wherein the determining of the driving related information comprises predicting an amount of power to be transferred to a powertrain of the vehicle based on the second speed profile, and predicting an amount of power to be used by an air conditioning system of the vehicle based on either one or both of solar radiation information or ambient temperature information.

20. The VCU of claim 13, wherein the processor is configured to determine a driving range of the vehicle based on a predicted amount of power to be used by the vehicle and either one or both of current state information of a battery of the vehicle or a current amount of fuel of the vehicle.

21. The VCU of claim 20, wherein the processor is configured to predict either one or both of state information of the battery or an amount of fuel at a destination based on the predicted amount of power to be used by the vehicle, and to determine whether the vehicle is able to reach the destination based on either one or both of the predicted state information or the predicted amount of fuel.

22. The VCU of claim 13, wherein the determining of the driving related information comprises generating guide information related to driving of the vehicle based on the second speed profile, and output the guide information to a user of vehicle.

23. The VCU of claim 22, wherein the processor is configured to compare a predicted average speed determined from the second speed profile to a target speed determined from driving history information of the vehicle, and to generate the guide information based on a comparison result.

24. The VCU of claim 22, wherein the processor is configured to identify a speed section satisfying a predetermined criterion in the second speed profile, and to generate the guide information related to driving on a path corresponding to the identified speed section.

* * * * *